July 27, 1943.   J. W. BOENING   2,325,364
CUTTER FEEDING DEVICE
Filed Nov. 23, 1942   2 Sheets-Sheet 1

INVENTOR.
Joseph W. Boening
BY Carlos G. Stratton
ATTORNEY

July 27, 1943.　　　J. W. BOENING　　　2,325,364
CUTTER FEEDING DEVICE
Filed Nov. 23, 1942　　　2 Sheets-Sheet 2

INVENTOR.
BY Joseph W. Boening
Carlos G. Stratton
ATTORNEY

Patented July 27, 1943

2,325,364

UNITED STATES PATENT OFFICE 2,325,364

CUTTER FEEDING DEVICE

Joseph W. Boening, Inglewood, Calif.

Application November 23, 1942, Serial No. 466,556

5 Claims. (Cl. 51—219)

The present invention relates generally to what is commonly known as a grinding fixture, the purpose of which is to guide the tool being ground during the grinding operation. More particularly the present invention is a hand operated fixture adapted to be mounted on a grinding table with the primary purpose of efficiently and accurately insuring the uniform grinding of tools in a speedy continuous operation whether the tool to be ground has one or more cutting edges to be ground up to the full capacity of the tool.

An object of the invention is the provision of a grinding fixture by means of which a tool of one or more cutting edges may be ground during a single continuous rotary movement of the tool and by which provision may be made for the number of cutting edges prior to the grinding operation with the assurance that such adjustment will effectively maintain throughout the operation, to the end that uniformity as to multiple cutting edges will result.

A further object is the provision of a grinding fixture which may be quickly and easily adjusted to work in hand, whether one or multiple cutting edges, by means of external adjustments of a simple character, and with which the work may be readily assembled and disassembled at the start and finish of the operation.

Grinding fixtures of the present character are concerned in general with the sharpening of the cutting edges of tools, such as drills and other boring or burring cutters as well as counter sink cutters, both right and left hand, integral pilot counter sinks, center drills and other types of small cutters, requiring that relieving or backing off be accomplished to remove metal of the tool behind its cutting edge or edges in order to provide clearance.

The foregoing and many other objects of the invention will clearly appear in the course of the following description in detail of the best structural mode thus far devised for carrying the invention into practical effect, and by reference to the accompanying drawings forming a part of this specification, and in which, Fig. 1 is a side elevation of the complete device.

Figure 2:
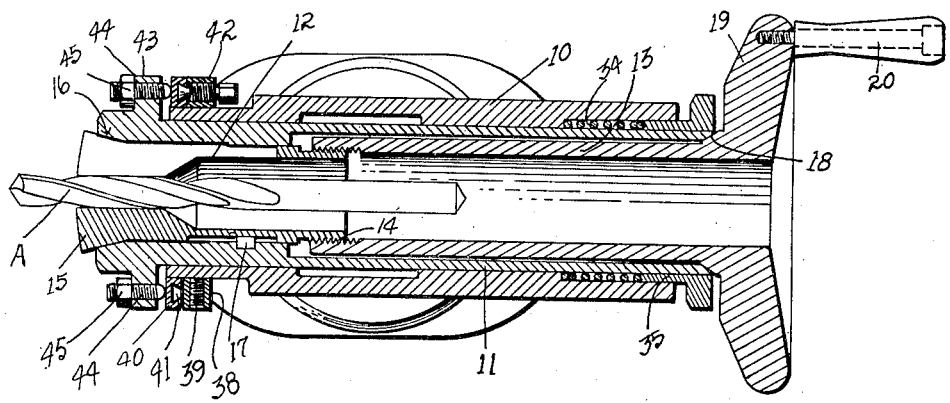
Fig. 2 is a horizontal sectional view taken substantially on an axial line through the arbor housing along the line 2—2 of Fig. 1.
Figure 1:
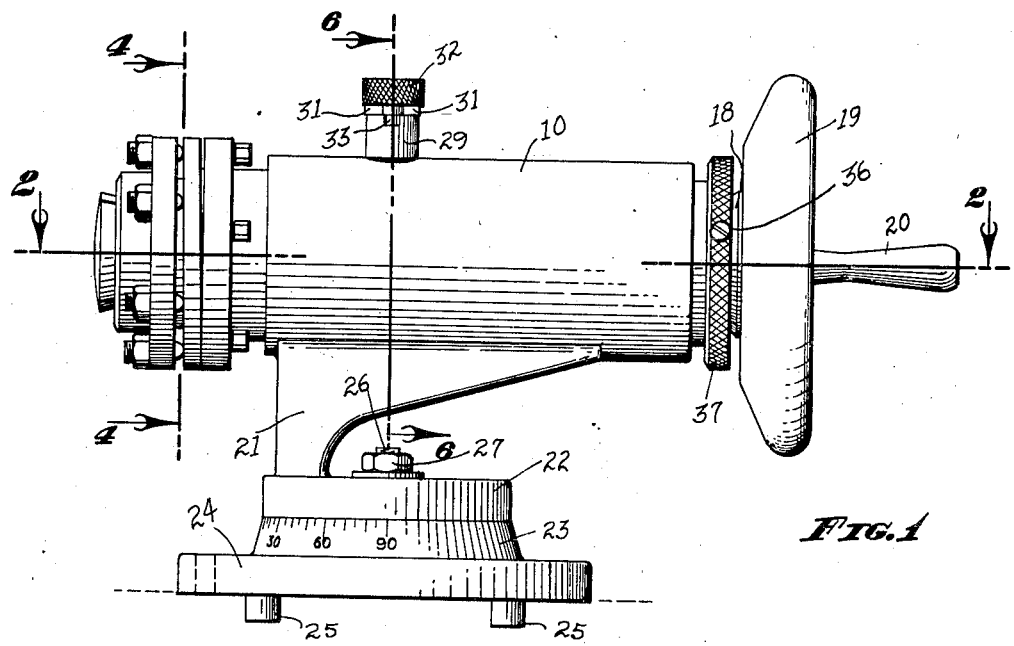
Figure 3:
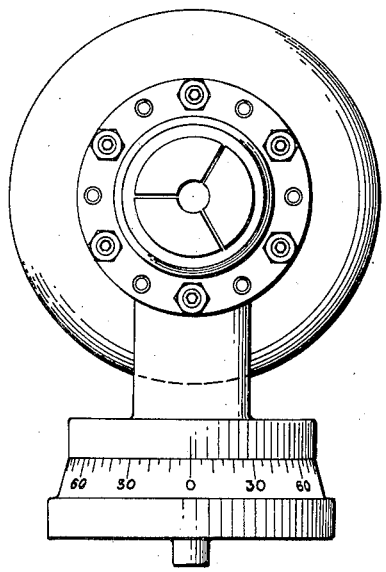
Fig. 3 is a front elevation.
Figure 4:
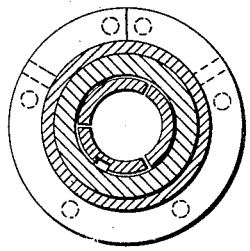
Fig. 4 is a vertical, transverse sectional view taken substantially on line 4—4 of Fig. 1.
Figure 5:
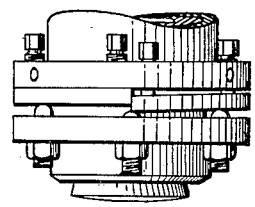
Fig. 5 is a top plan view of the forward portion of the arbor housing showing the linear stroke adjusting means of the arbor, and, Fig. 6 is a vertical transverse sectional view taken substantially on line 6—6 through the arbor locking means.

Referring now to the above described figures of the drawings and particularly to Figs. 1 to 3, inclusive, a horizontal, cylindrical arbor housing 10 forms a support therein for a slidably and rotatably interfitting cylindrical arbor 11 in the forward end of which is a hollow axially shiftable, but non-rotatable collet 12. This collet is controlled and manipulated by a hollow draw bar 13 with the rear portion of the arbor 11, the adjacent ends of the draw bar and collet having relatively engaging threaded ends at 14 whereby rotation of the draw bar in one direction, while the arbor 11 is held against rotation, causes the collet to be shifted inwardly or rearwardly relative to the arbor for gripping the work, as for example a twist drill as seen at A in Fig. 2.

For the above purposes the collet 12 may be of the well known split spring type, with a forward external nose portion 15 enlarging on a taper mating the flared forward end 16 of the bore of arbor 11. Any suitable spline, as at 17, may serve to permit relative lengthwise or axial movement of the collet while preventing its relative rotation. The forward and rear ends of the arbor 11 extend beyond the respective ends of housing 10 and the rearwardly projecting end thereof is preferably tapered to mate the tapered surface of an annular shoulder 18 around the rearwardly projecting end of draw bar 13 adjacent to its rear turning hand wheel 19 having a rearwardly projecting handle 20.

The arbor housing 10, as best seen in Figs. 1 and 3, has for its support a depending bracket stem 21 which, with a lower horizontal disc 22, forms a supporting pedestal seated on the upper circular platform 23 of a base member which also includes a flanged bottom portion 24 having screw or bolt openings and depending tenons 25 or other suitable means for anchoring the same solidly on a grinder frame or table. The platform 23 is annularly calibrated in the degrees of a circle from a zero point seen in Fig. 3 and the lower disc 22 has an index point cooperating with the calibrated platform and a central opening to receive the threaded bolt 26 upstanding from the base member. A nut 27 on said bolt serves as a means to clamp the disc 22, and consequently the arbor housing, at various angles for properly and desirably indexing the fixture and the work carried thereby, in respect to the grinder.

Figure 6:
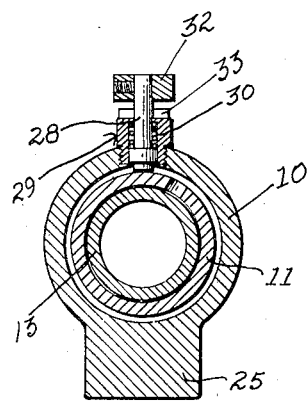

In order to lock the arbor 11 against rotation while the draw bar is rotated to clamp the work by rearward movement of the collet 12, a latch pin 28 is vertically shiftably mounted in a tubular case 29 threaded into the top portion of the housing 10 intermediate its ends. This latch pin actuated by a spring 30 is engageable at its lower end in a slotted opening 31 of the arbor, as seen in Fig. 6, when work is inserted and clamped. Thereafter, the arbor 11 engaged at its forward end by the collet and at its rear end by the draw bar, may be rotated in the housing 10, by the hand wheel 19 after the latch pin 28 has been raised to released position and partially turned so that the diametrically opposed ribs 31 beneath its upper exposed head 32 rest on the upper edge of case 29 rather than in slots 33 of the case which receive the ribs 31 when the latch pin is lowered into engaged position.

It will be noted in Fig. 2 that the rear end of the housing 10 is counter-bored to receive therein a coil spring 34 around the rear portion of arbor 11 and to form a shoulder constituting an abutment for the forward end of said spring. The rear end of the spring is engaged by a collar 35 adjustably fixed by a set screw 36, to the rearwardly projecting rear end portion of the arbor, the set screw being fixed through a knurled flange 37 of the collar. Thus, the effective tension of spring 34 may be governed to properly elastically hold the arbor at the limit of its rearward sliding or linear movement relative to the housing 10.

At its forward end housing 10 is reduced externally, providing an annular seat for an adjustable cam holding ring 38 which is secured thereto by a set screw 39. Against the forward surface of this ring 38, a split spring ring 40 is disposed and this latter ring which may be manipulated to shift either end thereof laterally in respect to its body plane to thus form a cam, has in its face opposing the holding ring 38, a dove-tail annular groove 41. In this groove the forward dove-tail ends of a series of circumferentially spaced cam adjustment screws 42 are disposed, these screws being threaded through the holding ring 38, with polygonal rear ends exposed for ready adjustment to vary the shape of the cam surface formed by the cam ring 40 depending upon the character of the work.

Forwardly of the cam ring 40 and its holding ring 38, the forwardly projecting forward end portion of the arbor 11 has an annular flange 43 of substantially the diameter of the cam ring 40 and opposing the latter. Threaded through the flange 43 at equidistantly spaced points therearound, are axially disposed abutment screws 44 whose forwardly projecting ends receive lock nuts 45 which engage the flange to lock the screws in adjusted positions. The rear ends of these screws 44 have hardened ball ends to engage the cam ring 40 and, while a series of six such screws are shown (see Fig. 3) it is obvious that any one or more of the screws may readily be shifted forwardly and out of effective control position depending upon the number of cutting edges of the tool supported for grinding.

The laterally displaced cam forming end of the cam ring 40 is controlled by the adjusting screws 42 to form a cam surface of a length depending upon the number of cutting edges of the tool in the collet since an abutment screw for each tool edge must drop off the cam of ring 40 before the screw controlling the back off or relief of the succeeding cutting edge rides the cam. Thus, if there are but two cutting edges as on the usual twist drill, all but two abutment screws 44 will be shifted forwardly out of operative position and out of action, leaving two diametrically opposed screws in position so that the cam surface will be formed by adjusting cam ring 40 to a lateral incline for almost one-half of its circumference. This extent of cam surface is gradually reduced as the number of cutting edges increases and the number of abutment screws in effective or operative position correspondingly increases.

In operation as each abutment screw 44 rides the cam surface of ring 40, the arbor 11, and the collet and draw bar in clamped engagement therewith, are shifted forward during rotation by means of the hand wheel 19. This forward movement is gradual so as to present more and more of the clamped tool against the grinding surface for the removal of more and more metal as a relief or back off behind the cutting edge. This movement is, moreover, against the tension of the return spring 34 and when the abutment screw, riding the cam, reaches the cam end and drops therefrom, the spring 34 immediately returns the arbor to its rearmost, normal position for the grinding of the next cutting edge.

It is apparent from the foregoing that after the tool A is clamped in the collet with the latch pin 28 holding the arbor 11 against rotation as described, the arbor 11, collet 12 and draw bar 13 are frictionally gripped to rotate and axially shift as a unit in the arbor housing, as soon as the latch pin is released. Rotation of these parts through a full revolution is by manual power through the hand wheel 19 and during this rotation the rotating unit is gradually shifted forwardly as each abutment screw rides the cam formed by the cam ring, and then abruptly shifted rearwardly as such abutment screw drops from the cam. At the end of the operation the latch pin is again dropped to lock the arbor and by then rotating the draw bar to the left, the collet may be released and the finished tool withdrawn.

Obviously since the cam ring can be adjusted to present either a right-hand or left-hand cam, and the unit formed by the arbor, collet and draw bar when clamped to one another, may be rotated either right or left, it is possible to grind tools having either right or left hand cutting edges. With the present tool holding fixture, various tools may be effectively, quickly and uniformly ground, having from one to six cutting edges, but no limitation is to be imposed on the number of edges except within the limits of the number of abutment screws 44 and cam ring adjusting screws 42 which may be effectively utilized.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. A tool holding grinding fixture, including an arbor housing, an arbor rotatable and axially shiftable in said housing, means for rotating the arbor, a tool holder carried by the arbor and movable therewith, cam means effective to shift the arbor and tool holder axially in one direction during rotation of the arbor, and a return spring engaging the arbor for continuously urging the same in the opposite direction, said cam means including an adjustably deformable split cam ring on the arbor housing, and cam engaging members carried by and around the arbor in spaced relation, the said cam engaging members being slectively shiftable into, and out of, effective position.

2. In a grinding fixture, an arbor, a tool holder carried thereby, a support in which said arbor is mounted to shift lengthwise and rotate, means for rotating said arbor, spring means constantly urging said arbor to shift in one direction, and relatively engaging members carried by the arbor and support for shifting the arbor in the opposite direction, one of said members being an adjustably deformable cam ring and the other member including an annular series of selectively positionable cam engaging abutments.

3. In a grinding fixture, an arbor, a tool holder carried thereby, a support in which said arbor is mounted to shift lengthwise and rotate, means for rotating said arbor, spring means constantly urging said arbor to shift in one direction, and relatively engaging members carried by the arbor and support for shifting the arbor in the opposite direction, one of said members being a split flexible cam forming ring and means for selectively flexing said ring to vary cam contour, and the other member including an annular series of cam engaging abutments, each of said abutments being individually shiftable into and out of cam engaging position.

4. In a tool holding grinding fixture, a housing, a support on which said housing is adjustable on a vertical axis, a tool holding arbor horizontally mounted through said housing to rotate and shift axially with respect thereto, means for manually rotating said arbor, spring means normally urging shifting movement of the arbor in one direction, a split spring ring around an end portion of said housing, means supported by the housing for holding and adjustably deflecting portions of said ring to cam shape, and a series of cam engaging elements spaced around the arbor and supported thereby opposite said ring, each of said elements having adjustable into and out of abutting engagement with the ring.

5. In a tool holding grinding fixture, a support, an arbor rotatable and axially shiftable through said support, means for manually rotating said arbor, tool holding means carried by the arbor, spring means for shifting the arbor in one direction, and cam means for shifting the arbor in the opposite direction, including a split spring ring around a portion of said support, means for holding and deflecting portions of said ring to form a stationary cam, and a series of cam engaging elements carried by and around the arbor, each of said elements being manually adjustable into and out of effective engagement with said cam ring.

JOSEPH W. BOENING.